United States Patent [19]

Lee, Jr.

[11] Patent Number: 4,483,224

[45] Date of Patent: Nov. 20, 1984

[54] STABILIZERS FOR A STEADY REST

[76] Inventor: Roy Lee, Jr., 10134 Briar Dr., Houston, Tex. 77042

[21] Appl. No.: 502,152

[22] Filed: Jun. 8, 1983

[51] Int. Cl.³ .............................................. B23B 25/00
[52] U.S. Cl. .................................... 82/39; 10/107 PH; 254/93 HP
[58] Field of Search ........................ 82/38 R, 38 A, 39; 10/107 R, 107 PH; 254/93 HP

[56] References Cited

U.S. PATENT DOCUMENTS

| 1,871,077 | 8/1932 | Mowat | 10/107 R |
| 2,610,824 | 9/1952 | Grier | 254/93 HP |
| 2,837,945 | 6/1958 | Griffiths | 82/39 |
| 3,101,015 | 8/1963 | Schuetz | 82/39 X |
| 3,514,799 | 6/1970 | Houser | 10/107 R |
| 4,061,310 | 12/1977 | Vetter | 254/93 HP |
| 4,065,989 | 1/1978 | Scheler | 82/38 A |
| 4,130,035 | 12/1978 | Langley | 82/38 A |

FOREIGN PATENT DOCUMENTS

| 567711 | 1/1933 | Fed. Rep. of Germany | 82/38 R |
| 509389 | 4/1976 | U.S.S.R. | 82/39 |

Primary Examiner—Leonidas Vlachos
Attorney, Agent, or Firm—Vaden, Eickenroht, Thompson, Bednar & Jamison

[57] ABSTRACT

A stabilizer for a steady rest is disclosed for supporting rotating cylindrical members during machining operations and the like that includes idler wheels supported by air jacks that allow limited lateral movement of idler wheels to accommodate at least some of the lateral movement of the rotating member that results when the member is crooked. Shock absorbers are positioned to dampen the lateral movement of the idler wheels to reduce the vibrations such lateral movement of the rotating member may produce at the surface being machined.

3 Claims, 4 Drawing Figures

STABILIZERS FOR A STEADY REST

This invention relates to steady rests for supporting rotating cylindrical members during machining operations and the like and, in particular, to steady rests designed to allow limited lateral movement of the idler wheels.

As explained in copending application Ser. No. 257,185, filed Apr. 24, 1981, now U.S. Pat. No. 4,397,054 and entitled APPARATUS FOR HANDLING PIPE TO EFFECT HIGH SPEED MACHINING OPERATIONS, before the invention disclosed therein, all efforts to control the lateral movement of crooked tubular members being rotated at high speeds during machining operations was to build bigger and more massive steady rests to resist the tendency of a tubular member to move laterally as it is rotated. The steady rest disclosed in that application is designed to allow limited lateral movement of the member being machined. This reduces the stress imposed on the steady rest, the chuck, and the lathe performing the machining operations.

It has now been discovered that by damping the lateral movement of the idler wheels on the steady rests supported by air jacks that this problem is substantially eliminated. Therefore, it is an object of this invention to provide an improved steady rest having idler wheels supported by inflated air jacks that include shock absorbers to dampen the lateral movement of the idler wheels produced by the rotation at high speeds of crooked pipe and the like to reduce the vibrations such movements may produce at the surface being machined.

These and other objects, advantages and features of this invention will be apparent to those skilled in the art from a consideration of this specification including the attached drawings and appended claims.

Figure 4:
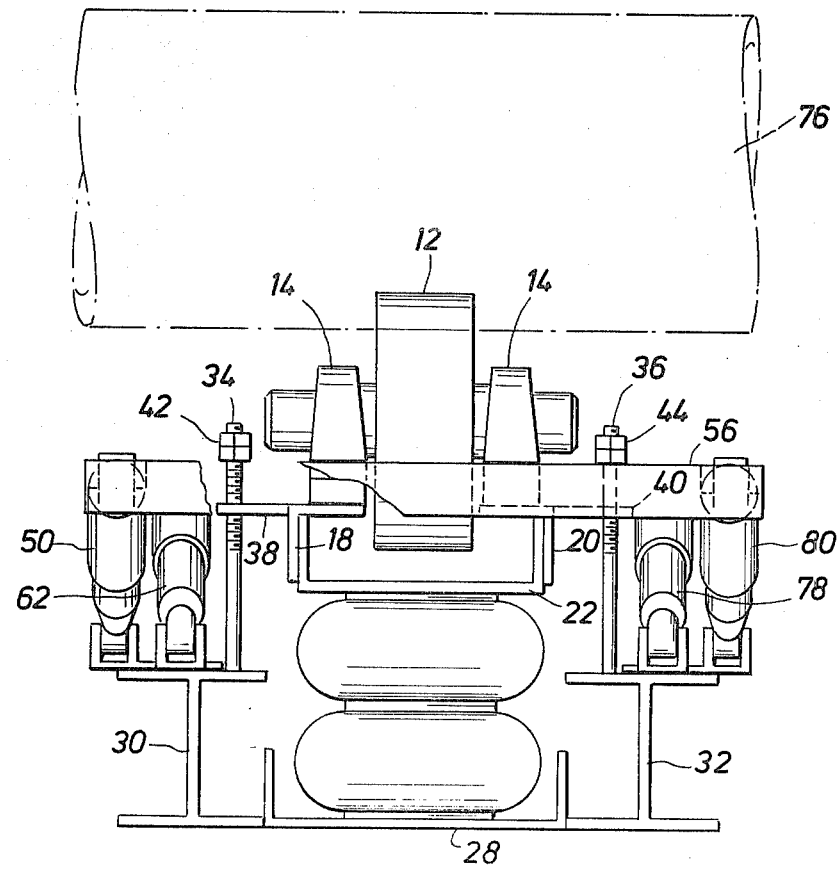
FIG. 4 is a view looking in the direction of arrows 4—4 of FIG. 3.

The steady rest includes idler wheels 10 and 12 mounted for rotation on parallel axis by pillow blocks 14. The pillow blocks are supported by angles 18 and 20, which are attached to the sides of channel 22. A pair of air jacks 24 and 26 are positioned under channel 22 to move the idler wheels up and down as the jacks are inflated and deflated. The jacks, in turn, are supported by base member 28. As best seen in FIG. 4, base member 28 includes side beams 30 and 32 which extend along opposite sides of channel 28. Threaded rods 34 and 36 are connected to beams 30 and 32 respectively and extend through openings provided in stop plates 38 and 40. They limit the upward movement of the idler wheels depending upon the location of nuts 42 and 44.

In accordance with this invention, a pair of shock absorbers are located on each side of the easy rest. This is done so that the damping force of the shock absorbers will be balanced. Each pair of shock absorbers is similarly mounted with respect to the steady rest so only the mounting of one pair will be described in detail.

Figure 3:
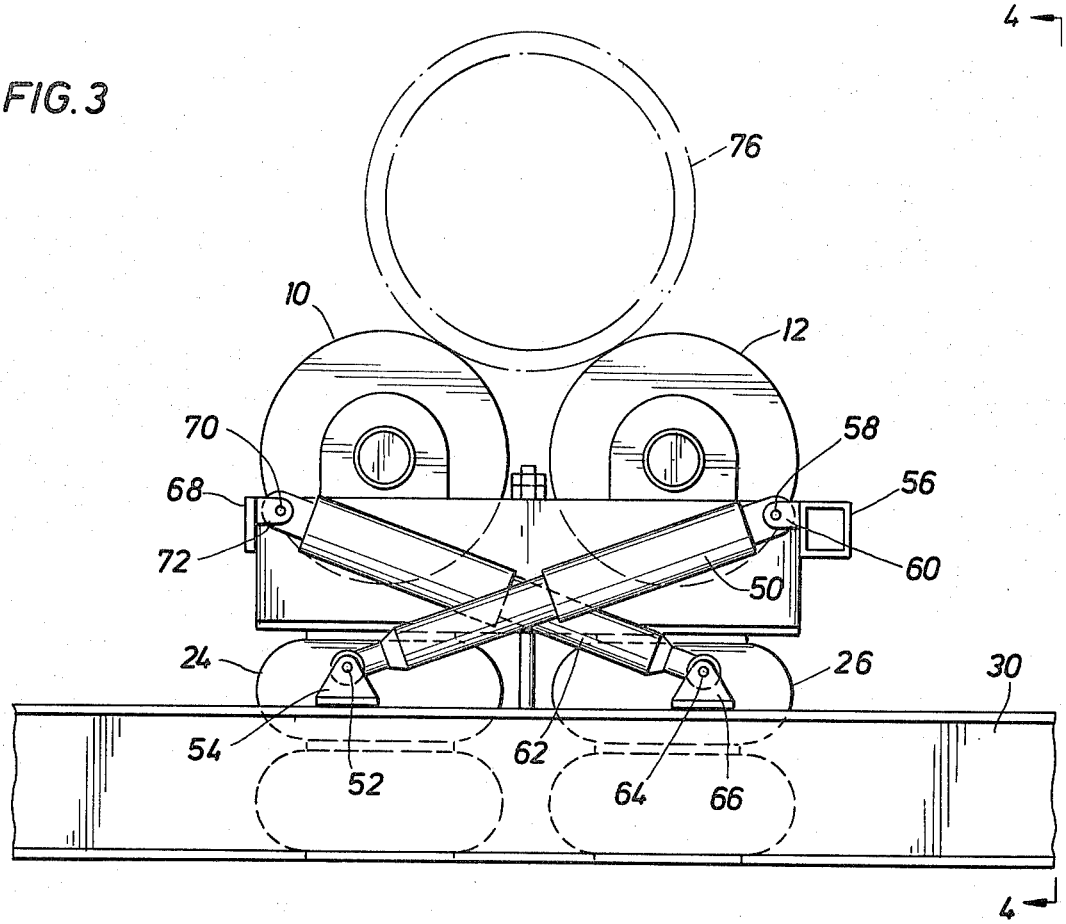
FIG. 3 is an end view of the steady rest of FIG. 1 with the steady rest in a raised position to support a joint of pipe during a machining operation.

In FIG. 3, shock absorber 50 has one end connected to beam 30 of the base by pivot pin 52 and bracket 54. The other end of shock absorber 50 is attached to mounting bar 56 that is attached to and extends across the end of channel 22. This end of the shock absorber is attached to mounting bar 56 by pivot pin 58 and mounting bracket 60. In the same manner, shock absorber 62 has one end attached to beam 30 by pivot pin 64 and mounting bracket 66 and the other end attached to mounting bar 68 by pivot pin 70 and mounting bracket 72. Thus, one end of each of the shock absorbers is attached to the base member for pivotal movement around a line that extends generally under one of the idler wheels. For example, shock absorber 50 is attached to the base member 30 through pivot pin 52, the rotational axis of which extends generally beneath idler wheel 10. The other end of shock absorber 50 is attached to the support means for the idler wheels for pivotal movement along a line that lies generally slightly below and to the outside of idler wheel 12. In this manner, the longitudinal axis of the shock absorber is positioned generally in a direction to resist lateral movement of the idler wheels as pipe 76, shown in dotted lines, is rotated at high speeds while being supported by the idler wheels.

Figure 1:
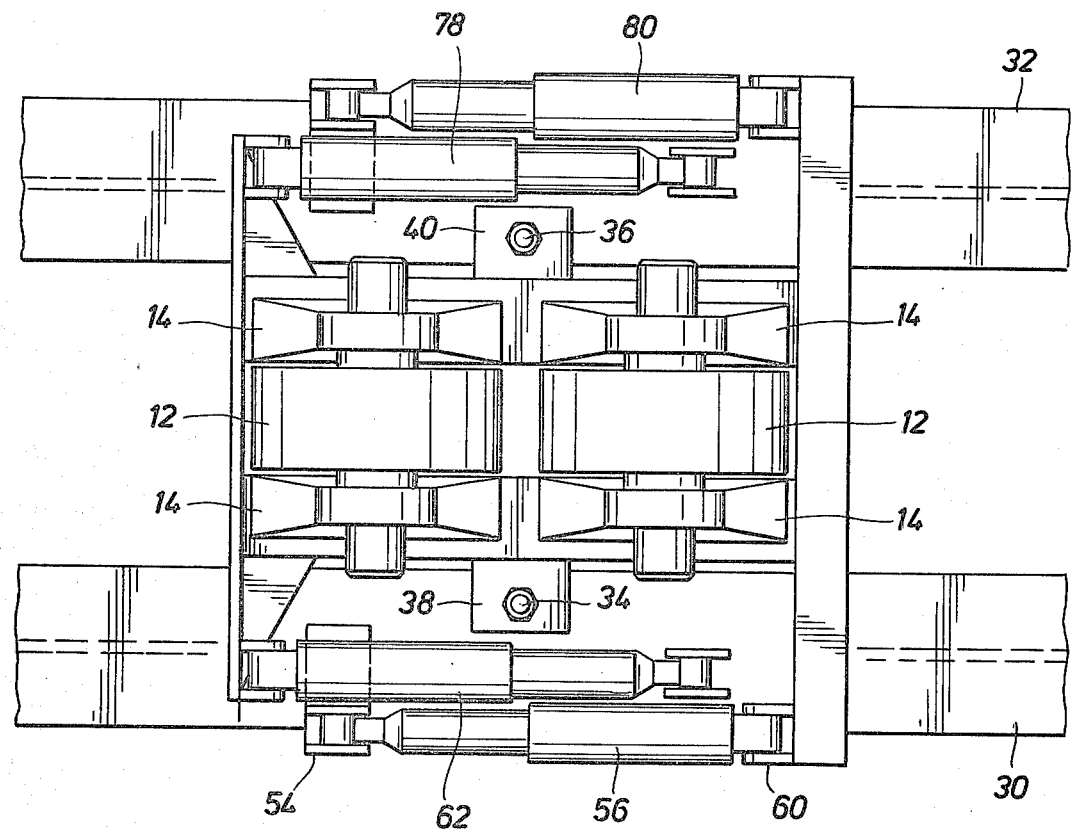
FIG. 1 is a top view of a steady rest equipped with shock absorbers to dampen the lateral movement of the steady rest.
Figure 2:
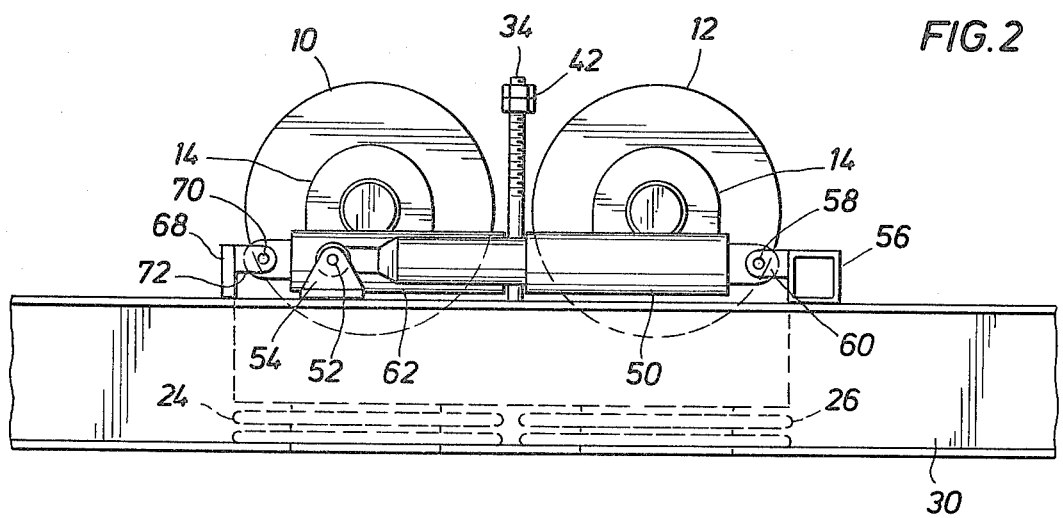
FIG. 2 is an end view of the steady rest of FIG. 1.

The other pair of shock absorbers 78 and 80 are mounted on the steady rest in a similar manner. The shock absorbers are connected so that each end can pivot relative to the idler wheel support assembly or the base member, as the case may be. Thus, the steady rest can still move laterally under the influence of the rotating pipe, but such movement is dampened by the shock absorbers. This arrangement also allows the steady rest to be lowered to the position shown in FIGS. 1 and 2 when air jacks 24 and 26 are deflated and to be raised to its pipe supporting position of FIGS. 3 and 4 when the jacks are inflated.

In the embodiment shown, standard automobile shock absorbers, such as Gabrial No. P9FB, are used. Adjustable type shock absorbers could be used also to allow the dampening effect of the shock absorbers to be adjusted depending upon the size of the pipe being supported by the steady rest.

From the foregoing it will be seen that this invention is one well adapted to attain all of the ends and objects hereinabove set forth, together with other advantages that are obvious and that are inherent to the method and apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

Whis is claimed is:

1. A steady rest for supporting a cylindrical member for high speed rotation during machining operations comprising a pair of idler wheels, means supporting the idler wheels for rotation around axes parallel to the longitudinal axis of a cylindrical member supported by the idler wheels, a pair of air cylinders having curved flexible walls or resilient material in side-by-side position below the idler wheels to support the idler wheel support means to allow limited lateral movement of the idler wheels to accommodate the tendency of the cylindrical member to move back and forth laterally as it is rotated on its longitudinal axis if it is not straight, base means supporting the air cylinders, and shock absorbing means connected between the base means and the idler wheel support means to assist the air cylinders in resisting the lateral movement of a nonstraight cylindrical member rotating rapidly on the idler wheels.

2. The steady rest of claim 1 in which the shock absorbing means includes two pairs of shock absorbers with one pair located on the oposite side of the idler wheel supprot means from the other pair so that the resistive forces exerted by the shock absorbers on the support means is balanced.

3. The steady rest of claim 2 in which each shock absorber has one end attached to the base for pivotal movement around a line that is parallel to the axis of rotation of the idler wheels that passes under one idler wheel and the other end attached to the idler wheel support means for rotation around a line that is parallel to the axis of rotation of the idler wheels and that passes along the outside of the other idler wheel to position the shock absorber with its longitudinal axis generally in a direction to resist lateral movement of the idler wheels.

* * * * *